E. D. FULFORD, DEC'D.
M. FULFORD, ADMINISTRATRIX.
TARGET THROWING TRAP.
APPLICATION FILED JAN. 14, 1904.
No. 918,432.
Patented Apr. 13, 1909.
2 SHEETS—SHEET 1.
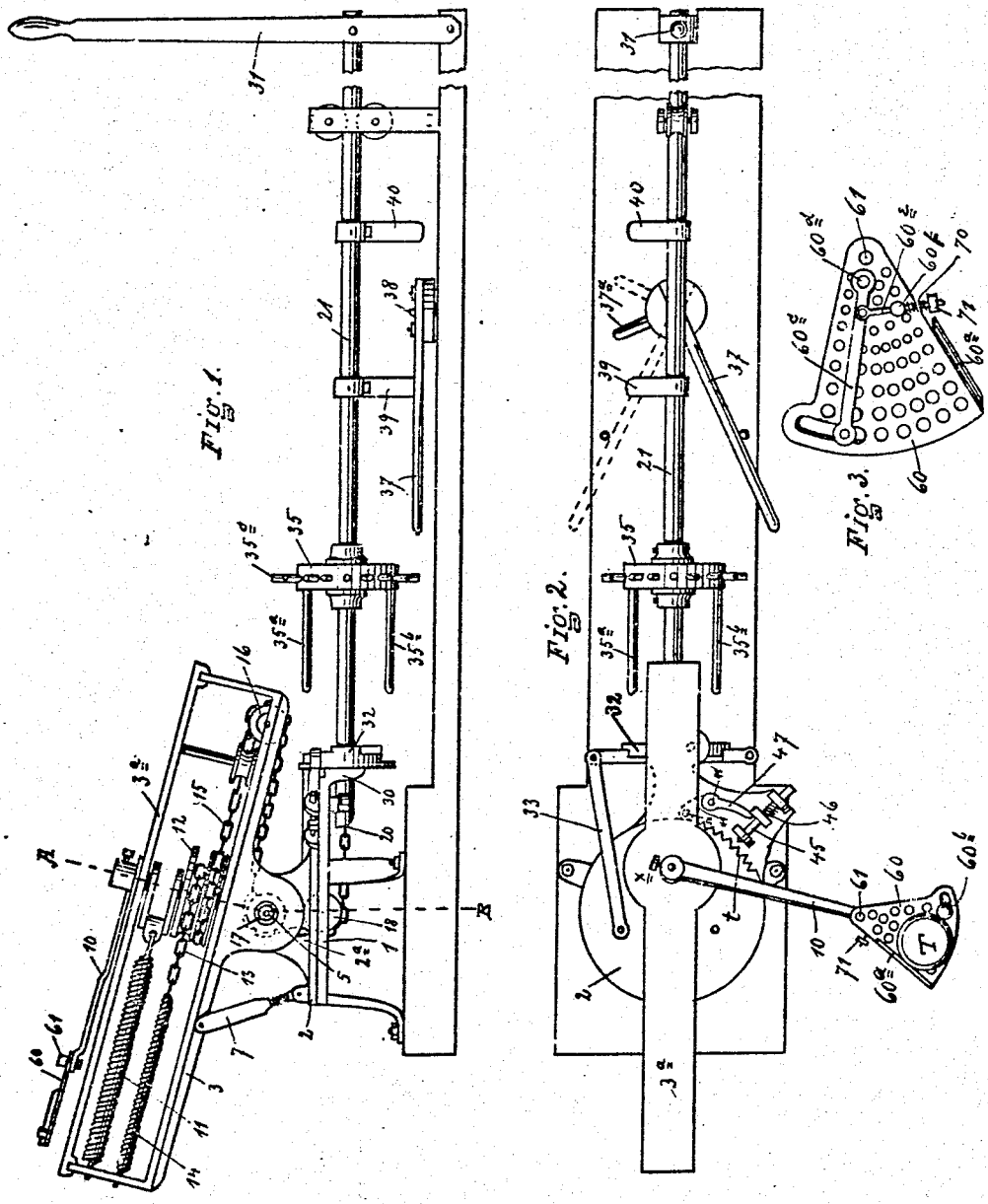
WITNESSES
Rich. A. George
E. W. Jones
INVENTOR
ELIJAH D. FULFORD
By Milton E. Robinson
ATTORNEY.

E. D. FULFORD, DEC'D.
M. FULFORD, ADMINISTRATRIX.
TARGET THROWING TRAP.
APPLICATION FILED JAN. 14, 1904.
918,432.
Patented Apr. 13, 1909.
2 SHEETS—SHEET 2.
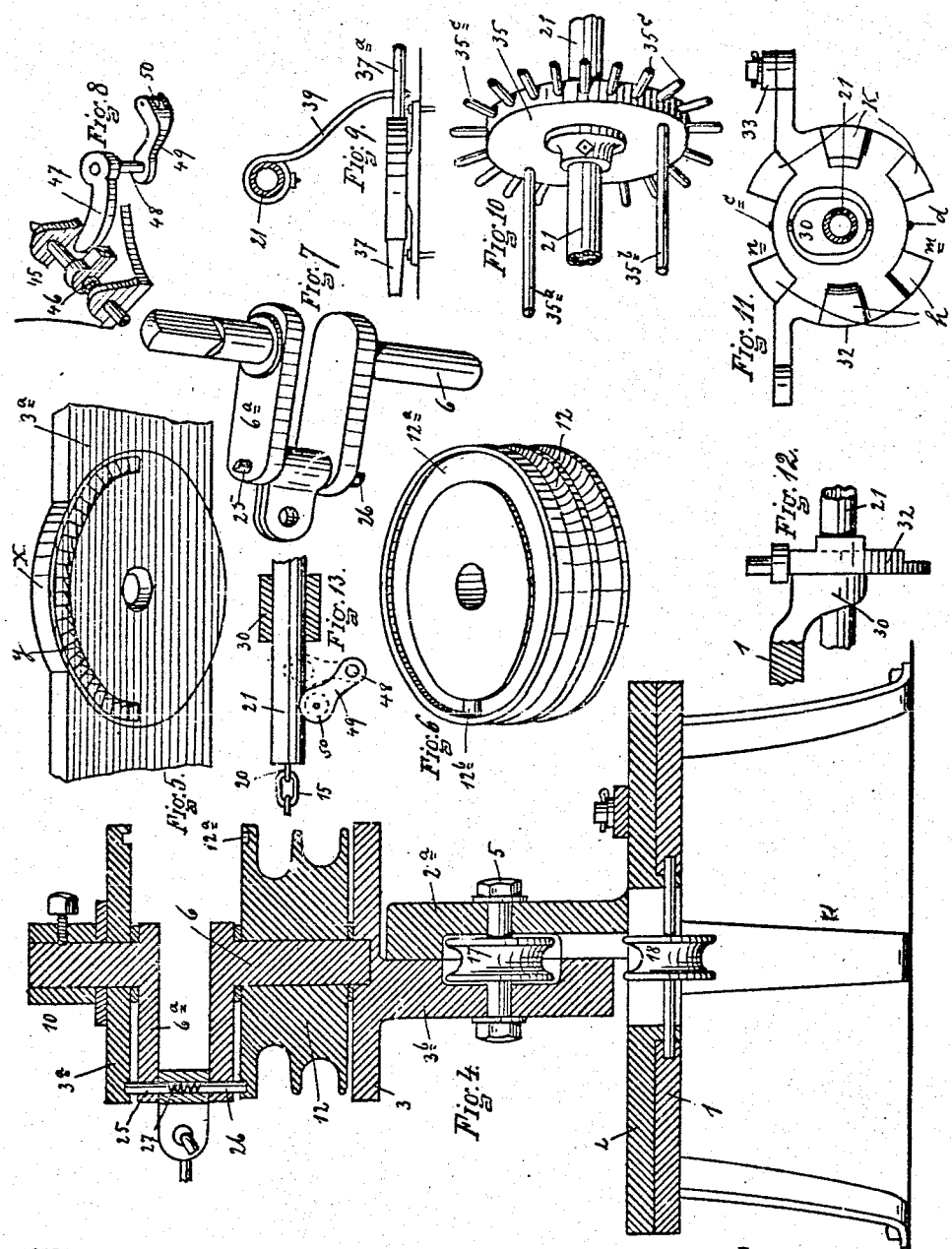
WITNESSES.
Rich. A. George
E. W. Jones
INVENTOR
ELIJAH D. FULFORD
BY Milton E. Robinson
ATTORNEY.

UNITED STATES PATENT OFFICE.

ELIJAH D. FULFORD, OF UTICA, NEW YORK; MATILDA FULFORD, ADMINISTRATRIX OF SAID ELIJAH D. FULFORD, DECEASED, ASSIGNOR TO HUGH C. LORD, OF ERIE, PENNSYLVANIA.

TARGET-THROWING TRAP.

No. 918,482.  Specification of Letters Patent.  Patented April 13, 1909.

Application filed January 14, 1904. Serial No. 188,970.

*To all whom it may concern:*

Be it known that I, ELIJAH D. FULFORD, of Utica, in the county of Oneida and State of New York, have invented certain new and useful Improvements in Target-Throwing Traps; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my invention is to provide an improved trap for throwing targets, commonly known as "clay pigeons", and which, among other things, is adapted to promptly return the throwing arm to substantially the same starting position, whereby the trap may be quickly and conveniently loaded, and is provided with a simple chance mechanism for changing the direction of delivery, and is adapted to throw single targets or more than one target simultaneously, and has sundry features of construction whereby simplicity, durability and convenient manipulation are secured.

In the drawings Figure 1 shows a side elevation of a trap of my improved construction. Fig. 2 shows a plan view of the same. Fig. 3 shows a bottom view of a target holder or carrier. Fig. 4 shows on an enlarged scale a section taken on line A—B of Fig. 1, with the shafts and cranks, however, in a different position from that in which it is shown in Fig. 1, and with the operating chains omitted. Fig. 5 shows an under-face view of a portion of the top bar of trap frame. Fig. 6 shows in perspective a double grooved pulley employed in the construction. Fig. 7 shows the shaft and crank employed in the construction, together with minor details. Fig. 8 shows details of a catch or lock and its operating mechanism. Fig. 9 shows details of the mechanism for operating the chance device employed in the construction. Fig. 10 shows in perspective a freely rotating chance wheel employed in the construction. Fig. 11 shows a face view and Fig. 12 a side elevation with its mountings of a rocking plate, adapted to coöperate with the chance wheel shown in Fig. 10. Fig. 13 shows in detail part of the mechanism for operating a lock or catch for securing the trap when in the act of throwing a target.

Referring to the reference letters and figures in a more particular description, 1 indicates a base plate, which is preferably provided with legs and secured on a fixed base or foundation. On the base 1 there is mounted a rotatable or rocking turn table 2, which is arranged to make a partial revolution and rests on top of the base plate 1. The base plate 1 and the turn table 2 are provided with axial openings. About centrally located on the turn plate 2, there is provided an upwardly projecting ear $2^a$, to which is hinged by means of the ear $3^b$ the tilting trap frame 3. The angle of the tilting frame 3, with reference to the plane of the base, may be adjusted by means of a turn buckle and screw 7. Mounted in the tilting frame is the shaft 6, having a crank $6^a$, the said crank being located between the main portion of the tilting frame and the top bar $3^a$ thereof. The shaft 6 is mounted to rotate freely in bearings in the frame and at the upper end, at the outer side of the top bar $3^a$, has secured thereto the throwing arm 10. To the crank $6^a$ is attached one end of the main throwing spring 11, and the other end of this spring is attached to the end of the frame 3. On the lower portion of the shaft 6 there is mounted a doubly grooved pulley, 12, which is free to rotate on the shaft, except as hereinafter stated. Passing partially around the pulley 12 and having one end attached thereto, is a chain 13. To the free end of this chain is attached the returning spring 14, the other end of the spring being attached to one end of the frame 3. In the other groove of the pulley 12, and passing in the opposite direction around the pulley, is a chain 15. One end of this chain is attached to the pulley 12, and after passing around the sheaves 16, 17 and 18 the other end is attached at 20 to the end of the reciprocating bar 21. The sheave 16 is mounted in the rear end of the trap frame, the sheave 17 is mounted on the bolt 5, which secures the frame 3 to the turn table, while the sheave 18 is mounted on a bearing in the base. In passing from the sheave 17 to the sheave 18, the chain 15 passes through the central openings in the base plate 1 and the turn plate 2. The wrist pin of the crank $3^a$ is provided with a longitudinal opening, which receives the two sliding catch bolts 25 and 26, with an intermediate spring 27 operating to project one or both of these catch pins.

Substantially centrally of the bar 3ª, there is provided a circular enlargement x. On the under face thereof, there is provided a semi-circle of ratchet teeth y, adapted to be engaged by the catch 25. In the upper face of the pulley 12 there is provided a circular groove 12ª, which is adapted to receive the projecting end of the catch 26. In this groove 12ª there is provided a single ratchet tooth, or projection, 12ᵇ adapted to be engaged by the catch 26. The operating bar 21, which may be extended to any suitable length, from the trap is mounted to slide freely through an opening in an ear or projection 30 on the base plate 1. For operating the rod or bar 21, there may be provided a suitable lever 31, adapted to move the bar in both directions.

Mounted on the base projection 30 on pivots c and d is the vibrating deflecting plate 32. This plate is provided with an arm connected by a link 33, with the turn plate 2. The deflecting plate 32 is provided with cut-out portions of wall, as indicated at m and n, and is provided with a series of projections of various heights, as indicated at h and K. Mounted on the operating rod 21, to freely rotate, is a wheel of chance 35, confined against lateral movement on the rod by collars. This wheel is provided with a pair of projecting push rods 35ª, 35ᵇ adapted to engage with the deflecting plate when the rod 21 is moved in the direction toward the trap. On the periphery, the chance wheel 35 is provided with a series of pins 35ᶜ, which are adapted to be engaged by the swinging lever 37 pivoted on the base at 38. For operating the lever 37, there are provided on the operating rod 21 a pair of projections 39 and 40, adapted to engage with an angularly projecting part 37ª of the lever 37. The projections 39 and 40 on the rod 21 are spaced with reference to the amount of longitudinal movement that is allowed for the bar 21, and are adapted to strike the arm 37ª a little before the completion of the movement in either direction. The arm 37 is adapted to swing from the position shown in full line to the position shown in dotted lines in Fig. 2, and stops are provided for limiting the movement at these two positions.

On a portion of the periphery of the turn table or plate 2, there is provided a series of teeth t. These teeth are adapted to be engaged by sliding bolt 45 in the nature of a catch mounted in projecting ears on the base, and operated to locking position by the spring 46. For operating the catch 45 to unlocked position, there is provided on the top of the base plate an arm 47, mounted on the short shaft 48, passing through the base plate and provided with an arm 49 on the lower end and which arm is preferably provided with a roller 50 in its end. This roller is adapted to engage with the end of the rod 21 when the latter is moved toward the trap.

The target holder or carrier consists of a plate-like body or base 60, pivoted at one corner or end at 61 to the outer end of the throwing arm 10. This carrier is provided with an upwardly extending wall 60ª, extending along one edge and against which one side of the target T is adapted to engage and affording a fixed (with reference to base) clamping part. Opposite to the wall 60ª there is provided a projecting button 60ᵇ, which is preferably mounted on the arm 60ᶜ located on the under side of the carrier and projecting upwardly therefrom through a slotted opening in the body of the carrier and affording a yielding clamping part. Except for parts 60ª and 60ᵇ the upper face of the base 60 is unobstructed. The arm 60ᶜ is pivoted at 60ᵈ and has a limited movement depending on the length of the slotted opening, through which the button 60ᵇ projects. For closing in the button and holding it under spring tension against or in opposition to the wall 60ª, there is provided an eye bolt 60ᵉ, passing through an opening in a suitable post 60ᶠ on the under side of the carrier, together with a spring 70 mounted on the outer end thereof, the tension of which spring may be adjusted by changing the position of the nut 71, on which one end of the spring engages.

In operation, the trap portion of the device is usually located behind a suitable screen to protect it and the loader from being accidentally shot. The rod 21 is extended preferably a number of rods to or adjacent to the position of the shooter, where the handle 31 is provided, and a man provided for operating the trap by moving the handle in a direction toward the trap, and then in the opposite direction. Ordinarily, under the influence of its own momentum, the throwing arm 10 will stop in approximately the position shown in Fig. 2. The pull rod 21 is then moved to its forward position so that the ratchet pawl 26 is in position to engage the tooth 12ᵇ. The rod is then reversed and pulled toward the rear, carrying with it the intermediate mechanism and the arm to a position approaching alinement with the trap. The crank will then be nearly on center and the trap will be in what would ordinarily be termed—set position. The movement of the crank of course places the main spring under tension so that this movement is a tensioning movement and the means effecting the movement a tensioning means. In loading, all the loader is required to do is to lay the target on the top of the carrier on the side, toward the machine, of the direct line between the button 60ᵇ and the wall 60ª. This makes the loading operating exceedingly simple and capable of being very rapidly performed.

It has been common in operating traps to employ two methods of tripping the throwing arm, one is to make the set position of the throwing arm slightly past the center in the direction in which the arm has to move in throwing the targets and maintain it in this set position by a latch, the tripping releasing or discharging, in this kind of trap being effected by removing the latch. In the embodiment of my invention disclosed the arm is held in position slightly back of the center so that the force of the main spring tends to move the arm in a direction opposite to that in throwing the target. The arm is held in this position by the pawl 26 and tooth 12$^b$, the puller holding the rod 21 in position to effect this, until the word "Pull". The movement of the rod 21 carries the arm with it past the dead center and thus gives discharge movement to the arm. As the crank and arm pass the dead center, the arm is tripped and is released from the mechanism by which it was held, this being in the example shown—the pawl 26 and ratchet tooth 12$^b$ acting against the main spring through the crank, and the mechanism which accomplishes this movement of the arm forms a discharging, tripping or releasing means. The spring 11 then comes in full operation and swings the arm 10 through the balance of the circle with great rapidity. In doing this, the centrifugal motion is sufficient to cause the target to force the button 60$^b$ back or away from the wall 60$^a$ of the carrier and escape through the enlarged opening thus made. At the time it escapes, it is moving with such velocity that it is thrown to a greater or less distance, depending on the tension of the spring and the several adjustments of the mechanism. After delivering the target, the arm 10, under the influence of its own momentum, swings by the point where the spring 11 would ordinarily hold it, and, as before stated, to about the position shown in Fig. 2. In order to prevent it from returning to a position parallel with the bar 3$^a$, or substantially so, the catch 25 on the crank 6$^a$ engages with the ratchet teeth $y$, and secures the arm at the farthest point that it makes in swinging around the circle under the influence of the spring 11. The catch 45, with the teeth $t$, are provided for preventing the throwing mechanism from changing its position under the influence of the re-action in throwing the target. Hence, at the time that the target is thrown, the catch 45 must be in engagement with the teeth $t$. It will be placed in such engagement by the operation of the spring 46, when the rod 21 has been withdrawn to a position where it is free from engagement with the roller 50 in the end of the arm 49, constituting a portion of the mechanism which operates this catch.

At the time that the lever 31 is moved away from the trap and the rod 21 moved in a corresponding direction, the chance wheel 35 is brought within the range of the swinging arm 37. Just before the completion of the movement, the projection 39 engages with the arm 37$^a$, swinging the striking arm 37 around toward the dotted position shown in Fig. 2, and striking one of the series of pins 35$^c$ on the chance wheel and giving it a rapid rotation. The chance wheel, after rotating more or less, comes to rest in some undetermined position. When the lever 31 is moved toward the machine, the end of the rod 21 first comes into contact with the operating mechanism of the catch 45, whereby the catch is withdrawn, leaving the turn plate 2 free to rotate on its axis. As the rod 21 is farther advanced in this direction, the pins 35$^a$ and 35$^b$ are liable to strike a high or low projection on the face of the shifting plate 32, as the case may be, whereby this plate may be rocked in one direction or the other, more or less, or the pins may be in a position whereby they pass into the cut-out places $m$ and $n$. In the latter case, the position of the plate 32 is not changed at all, but in the other case its position is more or less changed, depending on what portions of the face of the plate the pins 35$^a$ and 35$^b$ chance to engage.

Whatever shift is made in the position of the plate 32 is communicated to the turn plate 2 through the medium of the link 33, and, of course, the position of the trap frame 3 is shifted accordingly. The plate 32 with turn-plate 2 remain in the position in which they are last adjusted until the pins 35$^a$ and 35$^b$ chance to strike other projections on the plate 32 in connection with succeeding operations of the trap, when these parts are again shifted.

At the time that the operating rod 21 is moved toward the trap, the slack of the chain 15 is taken up by the operation of the returning spring 14, and the pulley 12 is rotated around to such a position that the tooth 12$^b$ will take a position on the proper side of the catch 26 in the crank for a succeeding operation. When the rod 21 is moved toward the trap, the projection 40 therefrom comes into operation to return the chance wheel striking lever 37 to its starting position.

Two or more nested targets may be placed in the carrier and thrown the same as one. In such case, however, it is preferable to tighten up the carrier spring 70 to compensate for the extra weight to be handled and to prevent the premature discharge of the targets. Of course, when the targets are delivered from the machine, they will separate, furnishing two marks or more when desired.

It is evident that sundry changes and modifications in and from the mechanism herein particularly described may be made without departing from the spirit of my invention.

It will be noted that the upper side of the crank $6^a$ forms a support for the ratchet pin 25 and in this respect acts as a disk for carrying said ratchet pin 25.

It will be noted that the projecting ear $2^a$ with its support, forms a pedestal on which the ejector frame is mounted and that said ejector frame is thus pivotally mounted on the base.

What I claim as new and desire to secure by Letters Patent is:

1. In a trap, the combination of a throwing mechanism mounted upon a turn plate, whereby the direction of delivery may be changed, a shifting deflector plate having varying projections connected with the turn plate, a rotatable chance wheel having projections adapted to engage with the shifting plate, means for moving the chance wheel toward and from the shifting plate, and means for rotating the chance wheel, substantially as set forth.

2. The combination in a trap of a base, a turn plate mounted on said base, a frame mounted on the turn plate, a shaft mounted in said frame in substantially an upright position, having a crank, a throwing arm mounted on said shaft, a throwing spring attached at one end to the crank and at the other end to the frame, a pulley mounted on the shaft and having means for engaging with and disengaging the shaft, a flexible connection passing around the pulley in one direction and connected to the operating mechanism and passing substantially centrally through the turn plate, a returning spring also connected with the said pulley, means for shifting the position of the frame and turn plate on the base, including a chance device, and means for operating the throwing arm through the mechanism described, substantially as set forth.

3. In a trap, the combination of a throwing mechanism mounted to provide for shifting the position to change the direction of delivery of the target, mechanism for shifting the position of the throwing mechanism, including a chance mechanism, and a lock for securing the throwing mechanism in any of its shifted positions during the throwing operation, and means for operating the lock, substantially as set forth.

4. The combination in a trap of a frame, a throwing arm mounted and pivoted to describe a circle in its operation, a spring for operating the arm in the throwing movement connected with a crank attached to the arm, means for moving the arm and crank to bring the spring under tension and pass it by the dead center of the crank preceding the throwing operation, and a catch mounted on the crank and moving therewith for preventing a backward movement of the arm prior to the spring passing the dead center, and a series of ratchet teeth or catch shoulders on the frame adapted to be engaged by said catch, substantially as set forth.

5. The combination in a target throwing trap of a frame, a throwing arm pivotally mounted in the frame to describe a circle, a crank rigidly connected with the throwing arm, a spring attached to the crank at one end and to the frame at the other, a catch mounted in the crank, a series of ratchet teeth or catch shoulders on the frame adapted to be engaged by said catch, a pulley axially mounted with reference to the pivot of the throwing arm in the frame, an automatic catch between the crank and said pulley, a flexible operating connection to the pulley and means for returning the pulley to normal position, substantially as set forth.

6. In a target-trap, the combination with a rotatably mounted throw-arm arranged to move in a complete circle, of a driven member associated with said throw-arm, a pulley-wheel provided with means for engaging said driven member, and means for actuating said pulley-wheel, substantially as set forth.

7. In a target-trap, the combination with a rotatable throw-arm arranged to move in a complete circle, of a driven member associated with said throw-arm, a pulley-wheel having ratchet-and-pawl engagement with said driven member, and means for actuating said pulley-wheel, substantially as set forth.

8. In a target-trap, the combination with a rotatable throw-arm arranged to move in a complete circle, of a driven member associated with said throw-arm, a pulley-wheel having means for engagement with said driven member, means for imparting rotation to said pulley-wheel, and means for retracting said pulley-wheel, substantially as set forth.

9. In a target trap, the combination with a base, of a frame pivotally supported thereon, a lock for holding the frame against movement, on the base including a sliding bolt, a swinging target-projecting arm, means for swinging the arm in one direction, and a device actuated by said swinging means and arranged to engage the bolt for moving the same.

10. In a target trap, the combination with a base, of a frame swingingly mounted thereon, target-projecting mechanism mounted on the frame, a movable lock for holding the frame against movement on the base, and means for operating the lock, said means including an actuating device for operating the projecting mechanism located in rear of the trap and having a connection therewith.

11. In a target trap, the combination with a base, of a frame pivotally supported thereon, a sliding bolt for holding the frame and base against relative movement, a reciprocatory member having a bolt-engaging device, and actuating means located at a distance from the trap and having a connection with the reciprocatory member.

12. The combination in a target throwing trap, of a frame, a throwing-arm mounted on the frame, a spring for operating the arm in its throwing operation, means for shifting the position of the frame, a lock for securing the frame in shifted position, and a common operating mechanism for setting and tripping the trap and shifting the position of said shifting means, substantially as set forth.

13. In a target trap, a stationary base, a normally revoluble pedestal on said base, a suitable throw-arm carried by said pedestal, and means for automatically locking said pedestal to said base as said throw-arm is released to permit the discharge of a target.

14. In a target trap, a suitable base, a pedestal carried by said base, a throw-arm carried by said pedestal, tensioning and releasing means for said throw-arm, and means whereby said base and pedestal are locked together upon the releasing movement of said discharging means.

15. In a target trap, a suitable base, a pedestal movable on said base, a throw-arm carried by said pedestal, tensioning and releasing means for said throw-arm, and means whereby said base and pedestal are locked together upon the action of said discharging means and unlocked upon the release of said means.

16. In a target-trap, a suitable base, a pedestal movably mounted on said base, a throw-arm carried by said pedestal, actuating means for releasing said throw-arm, and means operated by the actuating means for locking said pedestal to said base at a predetermined period.

17. In a target-trap, a suitable base, a pedestal movably mounted on said base, a throw-arm carried by said pedestal, a device connected with said throw-arm and adapted for tensioning said arm upon a predetermined movement and for releasing the same upon another predetermined movement, and means connected with said device, whereby said base and pedestal are locked together as the device is given its releasing movement.

18. In a target trap, the combination with a movable support, of a swinging target-projecting arm, means for swinging the arm in one direction, a lock for holding the support against movement, and a device operated by the swinging means for moving the lock.

19. The combination in a target throwing trap of a frame, a throwing arm mounted on the frame, a spring for operating the arm in its throwing operation, means for shifting the position of the frame, a lock for securing the frame in shifted position, and a common operating mechanism for setting and tripping the trap and shifting the position of said shifting means, substantially as set forth.

20. In a target trap, a suitable base, a pedestal carried by said base, a throw arm carried by said pedestal tensioning and discharging means for said throw arm, and means whereby said base and pedestal are locked together upon the discharging movement of said discharging means.

21. In a target trap, a suitable base, a pedestal movable on said base, a throw arm carried by said pedestal tensioning and discharging means for said throw arm, and means whereby said base and pedestal are locked together upon the discharging pull of said discharging means and unlocked upon the release of said means.

22. In a target trap, a suitable base, a pedestal movably mounted on said base, a throw arm carried by said pedestal, a pull chain connected with said throw arm and means connected with said chain for locking said pedestal at a predetermined point.

23. In a target trap, a suitable base, a pedestal suitably mounted on said base, a throw arm carried by said pedestal, a pull chain connected with said throw arm, and adapted for tensioning said arm upon a backward pull and for discharging the same upon a continued pull in the same direction and means connected with said pull chain whereby said base and pedestal are locked together as the pull chain is given its discharged pull.

24. In a target trap, a suitable base, a pedestal movably mounted on said base, a throw arm carried by said pedestal, a pull chain connected with said throw arm and adapted for tensioning said arm upon a backward pull and for discharging the same upon a pull in the same direction and means connected with said pull chain whereby said base and pedestal are locked together by the discharge pull of said pull chain and means for disconnecting said parts as said chain is released.

25. In a target trap the combination of a target ejector, oscillatory devices for varying the direction of flight of the target comprising means for automatically shifting the direction of flight, and a common mechanism for tripping and setting the ejector.

26. In a target trap the combination of a target ejector, oscillatory devices for varying the direction of flight of the target comprising means for automatically shifting the direction of flight, and a reciprocating pull mechanism for tripping and setting the ejector.

27. In a target trap the combination of a target ejector, oscillatory devices for varying the direction of flight of the target comprising means for automatically shifting the direction of flight, said means being arranged to move the oscillatory devices from and to different points with each operation and to start the movement in intermediate points, and devices for setting and tripping the ejector.

28. In a target trap the combination with the target ejector, oscillatory devices for varying the direction of flight of the target comprising automatic means for varying the same, said means acting under the influence of the energy delivered to the trap by the pull mechanism, and a pull mechanism for setting and tripping the trap.

29. In a target trap the combination of a target ejector, oscillatory devices therefor for varying the direction of flight of the target, a lock for securing the oscillatory devices in different positions, and a common mechanism for shifting the devices, actuating the lock, and tripping the trap.

30. In a target trap the combination of a target ejector, devices for varying the direction of flight of the target, and a common mechanism actuating the devices for shifting the same and for tripping and setting the ejector.

31. In a target trap the combination of a target ejector, devices for varying the direction of flight of the target, means for locking the devices in various positions, and a common means for setting and tripping the ejector, shifting the devices, and actuating the lock.

32. In a target trap, the combination of a target ejector, oscillatory devices for varying the direction of the flight of the target, and a common mechanism acting on the oscillatory devices for shifting the same and for tripping and setting the ejector.

33. In a target trap the combination of a target ejector, oscillatory devices for varying the direction of flight of the target, means for locking the devices in various positions, and a common means for setting and tripping the ejector, shifting the devices, and actuating the lock.

34. In a target trap the combination of a target ejector, oscillatory devices for varying the direction of the target, means for automatically shifting said devices, a lock for locking the devices in different positions, and a common mechanism for tripping the ejector and actuating the lock.

35. In a target trap the combination of a target ejector, oscillatory devices for varying the direction of the target, means for automatically shifting said devices, a lock for locking the devices in different positions, and a common mechanism for tripping and setting the ejector and actuating the lock.

36. In a target trap the combination of a target ejector, devices for varying the direction of flight of the target, means for tripping the trap to discharge the target and mechanism thrown into action by said means for actuating said devices and bringing the same to rest prior to the discharge of the target.

37. In a target trap the combination of a target ejector, devices for varying the direction of the target, means for tripping the trap to discharge the target, and mechanism acting under the energy delivered to the trap by said means for actuating said devices and bringing the same to rest prior to the discharge of the target.

38. In a target trap the combination of appliances comprising an ejector, an oscillatory device for varying the direction of flight, and a common mechanism for delivering energy to said appliances to move said device chance distances relatively to the movement of the mechanism.

39. In a target trap the combination of appliances comprising a target ejector, means for tripping the ejector, an oscillatory device for varying the direction of the target and a pull mechanism for delivering energy to said appliances and acting with said appliances to actuate with the energy delivered by said mechanism said device chance distances relatively to the movement of the mechanism.

40. In a target trap the combination of appliances comprising a target ejector, means for setting the ejector, an oscillatory device for varying the direction of the target, and a pull mechanism for delivering energy to said appliances, and acting with said appliances to actuate with the energy delivered by said mechanism said device chance distances relatively to the movement of the mechanism.

41. In a target trap the combination of appliances comprising a target ejector, means for setting and tripping the ejector, an oscillatory device for varying the direction of the target, and a pull mechanism for delivering energy to said appliances, and acting with said appliances to actuate with the energy delivered by said mechanism said device chance distances relatively to the movement of the mechanism.

42. In a target trap the combination of a target ejector, means for tripping and setting the ejector, devices actuated by the energy delivered by said means for shifting the direction of flight, and a lock for locking the devices in various positions.

43. In a target trap the combination of a target ejector, means for tripping and setting the ejector, devices actuated by the energy delivered by said means for shifting the direction of flight and shifting said devices chance distances relatively to the movement of said means, and a lock for locking the device in various positions.

44. In a target trap the combination of a reciprocating actuating mechanism, a chance mechanism set in motion by said reciprocating mechanism and moving chance distances relatively to the movement of said mechanism and controlling the direction of the flight of the target from the trap.

45. In a target trap the combination of an ejector, devices for varying the direction of flight of the target, means for actuating said ejector, a wheel rotated by said means chance distances relatively to the movement of the mechanism and devices controlled by said wheel controlling the direction of the flight.

46. In a target trap the combination of an ejector, devices for varying the direction of flight of the target, means for tripping the ejector, a chance wheel set in motion by said means and moving rotatively varying distances relatively to the movement of said means controlling the direction of flight.

47. In a target trap the combination of an ejector devices for varying the direction of flight of the target, means for setting the ejector, a chance wheel set in motion by said means and moving varying distances relatively to the movement of said means, devices controlled by said wheel controlling the direction of flight of the target.

48. In a target trap the combination of an ejector, devices for varying the flight of the target, a lock for securing the device in various positions, a chance wheel controlling the direction of the target, and a common mechanism for actuating the wheel and the lock.

49. In a target trap the combination of an ejector, means for tripping and setting the ejector, a chance wheel actuated by said means and devices for varying the direction of the target controlled by the chance wheel.

50. In a target trap the combination of an ejector, means for setting the ejector, devices for varying the direction of the target and for locking it in different positions, a chance wheel controlling said device, said lock and chance wheel being actuated by said means.

51. In a target trap the combination of an ejector, devices for varying the direction of flight of the target, means for setting and tripping the ejector, a lock for locking the devices in various positions, a chance wheel controlling the position of said devices, said lock and wheel being actuated by said means.

52. In a target trap the combination of an ejector, oscillatory devices for varying the direction of flight, comprising means for bringing said oscillatory devices at rest at various points for starting in either direction, mechanism for tripping the trap, and devices controlled by said mechanism for automatically shifting the direction of flight of the target.

In witness whereof, I have affixed my signature, in presence of two witnesses, this 6th day of Jan. 1904.

ELIJAH D. FULFORD.

Witnesses:
J. BENJ. BRADY,
EMMA S. HESSE.